(12) United States Patent
Thome et al.

(10) Patent No.: US 10,805,682 B2
(45) Date of Patent: Oct. 13, 2020

(54) READING OF MULTIMEDIA CONTENT

(71) Applicant: ORANGE, Paris (FR)

(72) Inventors: Dominique Thome, Chatillon (FR);
Serge Rigaudeau, Chatillon (FR);
Lionel Racin, Chatillon (FR); Stephane Davenet, Chatillon (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 16/426,628

(22) Filed: May 30, 2019

(65) Prior Publication Data

US 2019/0373340 A1  Dec. 5, 2019

(30) Foreign Application Priority Data

May 31, 2018 (FR) ...................... 18 54693

(51) Int. Cl.
*H04N 21/458* (2011.01)
*H04N 21/2187* (2011.01)
*H04N 21/437* (2011.01)
*H04N 21/845* (2011.01)

(52) U.S. Cl.
CPC ....... *H04N 21/458* (2013.01); *H04N 21/2187* (2013.01); *H04N 21/437* (2013.01); *H04N 21/8455* (2013.01)

(58) Field of Classification Search
CPC .......... H04N 21/8455; H04N 21/2187; H04N 21/437; H04N 21/458; H04N 21/4331
See application file for complete search history.

(56) References Cited

U.S. PATENT DOCUMENTS

| 10,250,938 B1* | 4/2019 | Jimenez | ............ H04N 21/4331 |
| 2003/0208612 A1* | 11/2003 | Harris | .................... H04N 7/163 |
| | | | 709/231 |
| 2008/0092168 A1* | 4/2008 | Logan | .................. G11B 27/322 |
| | | | 725/44 |

(Continued)

FOREIGN PATENT DOCUMENTS

EP       2061228 A1       5/2009

OTHER PUBLICATIONS

English translation of the French written translation dated Oct. 4, 2018 for corresponding French Application No. 1854693, filed May 31, 2018.

(Continued)

*Primary Examiner* — John R Schnurr
(74) *Attorney, Agent, or Firm* — David D. Brush; Westman, Champlin & Koehler, P.A.

(57) ABSTRACT

A method and device for reading an item of multimedia content at a predetermined time that is recorded in a broadcast stream received by the device. Before the time, the device: sends a request to provide an item of content to be read to a remote server, receives an identifier of the item of content, associated with an item of stream marker information; stores the identifier in correspondence with the item of marker information, and downloads all or part of the item of content on the basis of the received identifier. At the predetermined time, the device: receives a stream containing an item of marker information identical to the item of marker information already stored, and reads the downloaded item of content corresponding to the stored identifier, on the basis of the received identical item of marker information.

10 Claims, 9 Drawing Sheets

(56) References Cited

U.S. PATENT DOCUMENTS

| | | | |
|---|---|---|---|
| 2009/0187948 A1 | 7/2009 | Malik | |
| 2010/0154011 A1 | 6/2010 | Soo et al. | |
| 2012/0167132 A1* | 6/2012 | Mathews | H04N 21/4532 |
| | | | 725/32 |
| 2014/0331260 A1* | 11/2014 | Gratton | H04N 21/4312 |
| | | | 725/40 |
| 2018/0213272 A1* | 7/2018 | Igarashi | G06F 13/00 |
| 2018/0376197 A1* | 12/2018 | Gonzalez | H04N 21/26616 |

OTHER PUBLICATIONS

French Search Report dated Oct. 4, 2018 for corresponding French Application No. 1854693, filed May 31, 2018.

Written Opinion dated Oct. 4, 2018 for corresponding French Application No. 1854693, filed May 31, 2018.

\* cited by examiner

READING OF MULTIMEDIA CONTENT

I. FIELD OF THE INVENTION

The field of the invention is that of reading multimedia content in the audiovisual context.

The invention applies more particularly to reading an item of multimedia content with a scheduled broadcast time.

The invention may be implemented in particular in a terminal, such as for example a tablet, a mobile telephone, a smartphone, a personal computer, a television receiver, a set-top-box decoder or a radio set connected to a communication network, etc.

II. PRESENTATION OF THE PRIOR ART

Items of multimedia content with a scheduled broadcast time are for example television programs that are broadcast live, which are transmitted, via a data transmission network, and then received by a multimedia content-reading terminal of a given user, such as for example a digital television receiver equipped with a set-top-box decoder.

At the present time, such items of content are not always adequately suited to the interests and/or to the habits of the user watching them or listening to them. In the case for example of television news programs, these are broadcast at a predetermined time, for example at 8 p.m. for the evening edition. A user returning home after 8 p.m. will therefore miss all or part of the news program, thereby meaning that he has to wait for the entire news program to be available in delayed broadcast mode, also called catch-up TV or replay TV in the commonly used terminology.

It also happens that the types of radio or television content that are broadcast are not of particular interest to the user, who is interested in quite specific subjects, which may sometimes also be considered to be too specific by television or radio stations for said stations to want to broadcast content on these subjects at peak audience times, in particular the 8 p.m.-11 p.m. time slot. This results in the user tending to flick from one station to another in order to search for multimedia content that pleases him, or even shunning the television or radio stations in order to turn to other types of multimedia content, such as for example multimedia content downloadable from content provision platforms. These items of content are accessible in multimedia content catalogs, such as multimedia libraries, for example video on demand (VOD) catalogs, audio and/or video podcast catalogs, etc. However, the services offering these downloadable items of multimedia content are more often than not paid, and require the user to perform certain steps in order to subscribe to the service, select the content that he wishes to watch or listen to, and then download said content. Moreover, once the items of VOD content have been downloaded, they have to be read within a short period, thereby meaning that the user has to be available during this short period in order to benefit from the downloaded content.

Another drawback of content with a scheduled broadcast time lies in the fact that the viewing or listening conditions are not always optimal due to the data transmission rate, which is sometimes insufficient between the content provision platform and the local area network to which the digital television receiver is connected. Due to this, it is impossible for the user to view or to listen to the multimedia content with a high level of quality.

III. SUMMARY

One subject of the present disclosure relates to a method for reading an item of multimedia content, at a predetermined time recorded in a broadcast stream received by a device for reading multimedia content.

The reading method according to an exemplary embodiment of the present disclosure is noteworthy in that, at the level of a device for reading the item of multimedia content, the following is implemented:

before the predetermined time:
  sending a request to provide an item of multimedia content to be read to a remote server,
  receiving an identifier of the item of multimedia content to be read, the identifier being associated with an item of stream marker information,
  storing the received identifier in correspondence with the received item of marker information,
  downloading all or part of the item of multimedia content on the basis of the received identifier,
at the predetermined time:
  receiving a stream containing an item of marker information identical to the item of marker information that was stored before the predetermined time,
  on the basis of the received identical item of marker information, reading the downloaded item of multimedia content, corresponding to the identifier stored in correspondence with the item of marker information.

An exemplary embodiment of the present disclosure advantageously makes it possible to invite the user of a device for reading multimedia content to store in advance, in the reading device, all or part of an item of multimedia content that the user is able to view and/or listen to at a predetermined time associated with an item of marker information recorded in a broadcast stream that is received by the reading device.

Given the fact that the downloading of all or part of the item of multimedia content to be read at the predetermined time takes place in advance in the reading device, the item of multimedia content may advantageously be downloaded with a level of quality higher than that which it would have if it were to be broadcast in real time, which is all the more beneficial for a user whose local area network, to which the reading device is connected, has a low transmission rate.

The downloading may for example be implemented in periods in which the audience is low, so as to avoid burdening the network, which would be brought about by launching a plurality of requests to provide content coming from a plurality of reading devices eligible for the service offering such downloading. The downloading may also be implemented in periods in which the reading device is in operational standby (but active for technical services) so as to avoid, when the reading device is operating, any problem of under capacity of the local area network of the user, which would have to absorb both the downloading of the item of multimedia content to be read and the reception of the stream transporting the content broadcast by a station selected by the user.

Lastly, the advantage of downloading the item of multimedia content in advance leads to reading of this item of content that is stable, since it is independent of the bit rate fluctuations of the local area network to which the reading device is connected.

By virtue of an exemplary embodiment of the present disclosure, the user will thus have the possibility of viewing or listening to the items of multimedia content even before they are broadcast, this being particularly advantageous when this involves for example pre-recorded radio or television programs. Since the items of multimedia content are recorded, the user is advantageously able to position himself where he wants in the content in order to play it, to skip over certain passages, to return to the beginning or to the end, etc., thereby making the reading method much more flexible than the one proposed in connection with catch-up TV/replay TV services (available after complete broadcast), or even with the start over (restart) service, which relates only to content currently being broadcast.

According to one particular embodiment, when it is part of the item of multimedia content that has been downloaded and then read at the predetermined time, the downloading of the remaining part of the item of multimedia content continues at the same time as the reading of the downloaded part, such that the remaining part of the item of multimedia content is read following the downloaded part that has been read at the predetermined time.

Such an embodiment allows a user interested in an item of multimedia content beginning at a defined time in the programming schedule, and who is not available at this defined time, to be able to view or listen to the entire item of content later on, and to do so when he wants, since the content has been downloaded, with a level of quality higher than that of the item of content currently being broadcast.

According to another embodiment, when it is part of the item of multimedia content that has been downloaded and then read at the predetermined time, the remaining part of the item of multimedia content is read in the stream in real time, for example by way of a known adaptive streaming method (DASH for "Dynamic Adaptive Streaming over http"), following the downloaded part that has been read at the predetermined time.

Such an embodiment is advantageous if the remaining part of the item of multimedia content has not been able to be downloaded in time.

According to one embodiment, the user has the possibility of adjusting the usage parameters of his reading device according to various techniques below:
  downloading the entire item of multimedia content in high quality in advance,
  streaming the rest of the item of multimedia content if the entire item of content has not been able to be downloaded before the broadcast time thereof,
  value of the transmission rate of the item of content to be downloaded,
  value of the bit rate of the item of content to be downloaded,
  etc.
According to another particular embodiment:
  the item of marker information that is received before the predetermined time is furthermore associated with a time equal to, or slightly before, the predetermined time of reading of the item of multimedia content,
  the downloading of the item of multimedia content is implemented at a rate that takes into account the time equal to, or slightly before, the predetermined time of reading of the item of multimedia content.

By virtue of this embodiment, the downloading of the item of multimedia content to be read may be implemented at a variable bit rate. Thus, the bit rate will be all the higher (respectively lower) the shorter (respectively longer) the duration separating the time at which the item of information in relation to the item of multimedia content to be read is received and the time equal to, or slightly before, the predetermined time of reading of the item of multimedia content.

According to another particular embodiment, when sending the request to provide the item of multimedia content to be read at the predetermined time to the remote server, the request contains an item of profile information of a user of the reading device.

Such an embodiment allows the user to set the reading device according to at least one criterion in accordance with his personal interests. Such a criterion may be linked to the genre of the item of content (for example: news, film, variety programs, etc.), to a category of the item of content (for example: science fiction, classical music, wild animals, etc.). Such a criterion may also be linked to the location of the user (for example: district of the town in which the user lives, the name of his road or of his neighborhood, etc.). Such a criterion may also be temporal, for example be linked to one or more time slots during which the user tends to watch television or to listen to the radio.

By virtue of such setting, it is possible to download in advance, in the reading device of the user, an item of multimedia content:
  that has an optimum level of audio and/or video quality,
  while at the same time complying with the interests of the user,
  and while at the same time corresponding to the editorial policy of the radio broadcast or television broadcast company.

According to another particular embodiment, a stream representative of at least one item of multimedia content, different from the item of multimedia content to be read at the predetermined time, is received by the reading device, in parallel with the stream that is received before and/or at the predetermined time of reading of the item of multimedia content.

Such an embodiment allows the reading device to download an item of multimedia content in advance, before the predetermined time of reading thereof, while the user is viewing and/or listening to another item of multimedia content currently being broadcast, such downloading being completely transparent to the user. Such an embodiment is suitable for users having a local area network having a data transmission rate high enough to receive the item of content currently being broadcast and the item of multimedia content to be downloaded.

Furthermore, the benefit of the embodiment that has just been mentioned lies in the fact that the other item of multimedia content scheduled for the predetermined time, as recorded in the broadcast stream that is received by the reading device, may advantageously be replaced with the item of multimedia content that has been stored in advance in the reading device of the user. In this way, regardless of the time at which the user selects a broadcast station, an item of multimedia content may be offered to the user, as a replacement for the item of multimedia content broadcast live by the selected broadcast station. Such an embodiment therefore makes it possible to enrich the content schedule offered by broadcast stations, through the possibility for the user of (automatically or non-automatically) viewing or listening to an item of multimedia content better suited to his interests, instead of the scheduled item of multimedia content. The item of multimedia content of interest is advantageously recovered by the reading device from a remote server, before the predetermined time of broadcasting of the item of multimedia content scheduled in the programming schedule, so as to avoid having to transmit the item of multimedia content of interest to the reading device at the same predetermined time, in parallel with the broadcast stream of the scheduled item of multimedia content. Such a provision makes it possible to avoid overloading the local area data transmission network to which the reading device is connected, and more generally the communication network that links the multimedia content server and various reading devices capable of requesting content of interest at the same predetermined time of broadcasting of the scheduled item of multimedia content.

Thus, by virtue of an exemplary embodiment of the present disclosure, given the fact that the item of multimedia content is stored in advance in the reading device, even a user having a low transmission rate would have the possibility of viewing and/or listening to an item of multimedia content suited to his interests, instead of a scheduled item of multimedia content, in optimum operating conditions. This means that an exemplary embodiment of the present disclosure addresses a wide range of reading devices, whether or not these be limited in terms of bit rate, and with a suitable storage space.

Another advantage of the embodiment that has just been described lies in the fact that, in the absence of multimedia content downloaded in the reading device according to an exemplary embodiment of the present disclosure, in spite of this, the user accesses the content transported in a broadcast stream of a given station, which thus constitutes a stream received by default by the reading device.

According to another particular embodiment, following sending of the request to provide the item of multimedia content to be read at the predetermined time to the remote server, the reading device receives, in addition to the identifier of the item of multimedia content to be read, which is associated with an item of stream marker information, at least one other identifier of an item of multimedia content to be read at another predetermined time, the other identifier itself being associated with a corresponding item of stream marker information.

By virtue of this other embodiment, the method advantageously proposes to download a plurality of items of multimedia content to be read at respective predetermined times, so as thus to form, for the user, a customized broadcast station, for which the broadcast stream contains a plurality of items of marker information respectively associated with a plurality of items of multimedia content downloaded beforehand in the reading device of the user.

According to another particular embodiment, the order of the items of marker information and/or the content of the items of marker information is able to be modified.

Thus, an item of multimedia content associated with a given item of marker information may be substituted with an item of multimedia content associated with another item of marker information.

According to another particular embodiment, the temporal marking of at least one item of marker information in the broadcast stream may be deleted if it is decided not to broadcast the item of multimedia content associated with this item of marker information.

According to another particular embodiment, the temporal marking of at least one item of marker information in the broadcast stream may be added if it is decided on the fly to add an item of multimedia content associated with this item of marker information. Such an embodiment may prove useful if the editorial policy of the television broadcast or radio broadcast company has to be modified in real time.

The content broadcast station companies thus have the possibility of modifying, on the fly, in the broadcast stream, the intended order of insertion of the items of marker information or else replacing the content of one item of marker information with another one, which has no impact for the user, whose items of multimedia content to be read have been downloaded in advance in association with the corresponding items of marker information. The station companies may also delete, on the fly, the recording of an item of marker information that was planned.

According to another particular embodiment, before the predetermined time of reading of the item of multimedia content, the identifier of the item of multimedia content, which has been received, is an address for accessing the item of multimedia content from the remote server or another remote server.

By virtue of this embodiment, the device receives, directly in response to the request to provide multimedia content that it sent to the remote server, an address for accessing a file containing said item of content, such as for example a video or audio file. In this way, the reading device is able, virtually directly in response to the request, to download the file that contains the requested item of content from the remote server or from another remote content server.

According to another embodiment, before the predetermined time of reading of the item of multimedia content, the identifier of the item of multimedia content, which has been received, is a character string from which the reading device creates an address for accessing the item of multimedia content from a content server different from the remote server.

Such a provision allows the reading device, by reconstructing the access path to the item of content by itself, to access a content server that belongs not to the broadcast station companies but to independent content providers and partners of the telecommunications operator to which the user has subscribed.

The various abovementioned embodiments or implementation features may be added, independently or in combination with one another, to the reading method defined above.

An exemplary embodiment of the present disclosure also relates to a device for reading a stream representative of an item of multimedia content at a predetermined time.

Such a reading device is noteworthy in that it comprises a processing module that is designed to implement the following:

before the predetermined time:
    send a request to provide an item of multimedia content to be read to a remote server,
    receive an identifier of the item of multimedia content to be read, the identifier being associated with an item of stream marker information,
    store the received identifier in correspondence with the received item of marker information,
    download all or part of the item of multimedia content on the basis of the received identifier,
  at the predetermined time:
    receive a stream containing an item of marker information identical to the item of marker information that was stored before the predetermined time,
    on the basis of the received identical item of marker information, read the downloaded item of multimedia content corresponding to the identifier stored in correspondence with the item of marker information.

An exemplary embodiment of the present disclosure also relates to a computer program including instructions for implementing the reading method according to an exemplary embodiment of the present disclosure when it is executed on a terminal or more generally on a computer.

Each of these programs may use any programming language, and be in the form of source code, object code, or of intermediate code between source code and object code, such as in a partially compiled form, or in any other desirable form.

An exemplary embodiment of the present disclosure also targets a computer-readable recording medium on which there is recorded a computer program, this program including instructions suitable for the implementation of the reading method according to an exemplary embodiment of the present disclosure as described above.

Such a recording medium may be any entity or device capable of storing the program. For example, the medium may include a storage means, such as a ROM or a RAM, for example a CD-ROM, a microelectronic circuit ROM or RAM, a USB key, or else a magnetic recording means, for example a hard disk.

Moreover, such a recording medium may be a transmissible medium such as an electrical or optical signal, which may be conveyed via an electrical or optical cable, by radio or by other means. The program according to an exemplary embodiment of the present disclosure may in particular be downloaded from an Internet network.

As an alternative, the recording medium may be an integrated circuit in which the program is incorporated, the circuit being designed to execute or to be used in the execution of the abovementioned reading method.

The abovementioned corresponding reception device, computer program and recording medium have at least the same advantages as those conferred by the reading method according to an exemplary embodiment of the present disclosure.

IV. LIST OF THE FIGURES

Other advantages and features will become more clearly apparent on reading the following description of a plurality of particular embodiments of the disclosure, given by way of simple illustrative and non-limiting example, and of the appended drawings, among which:

FIG. 1 schematically shows a first embodiment of an architecture in which the method for reading multimedia content is implemented;

Figure 1:
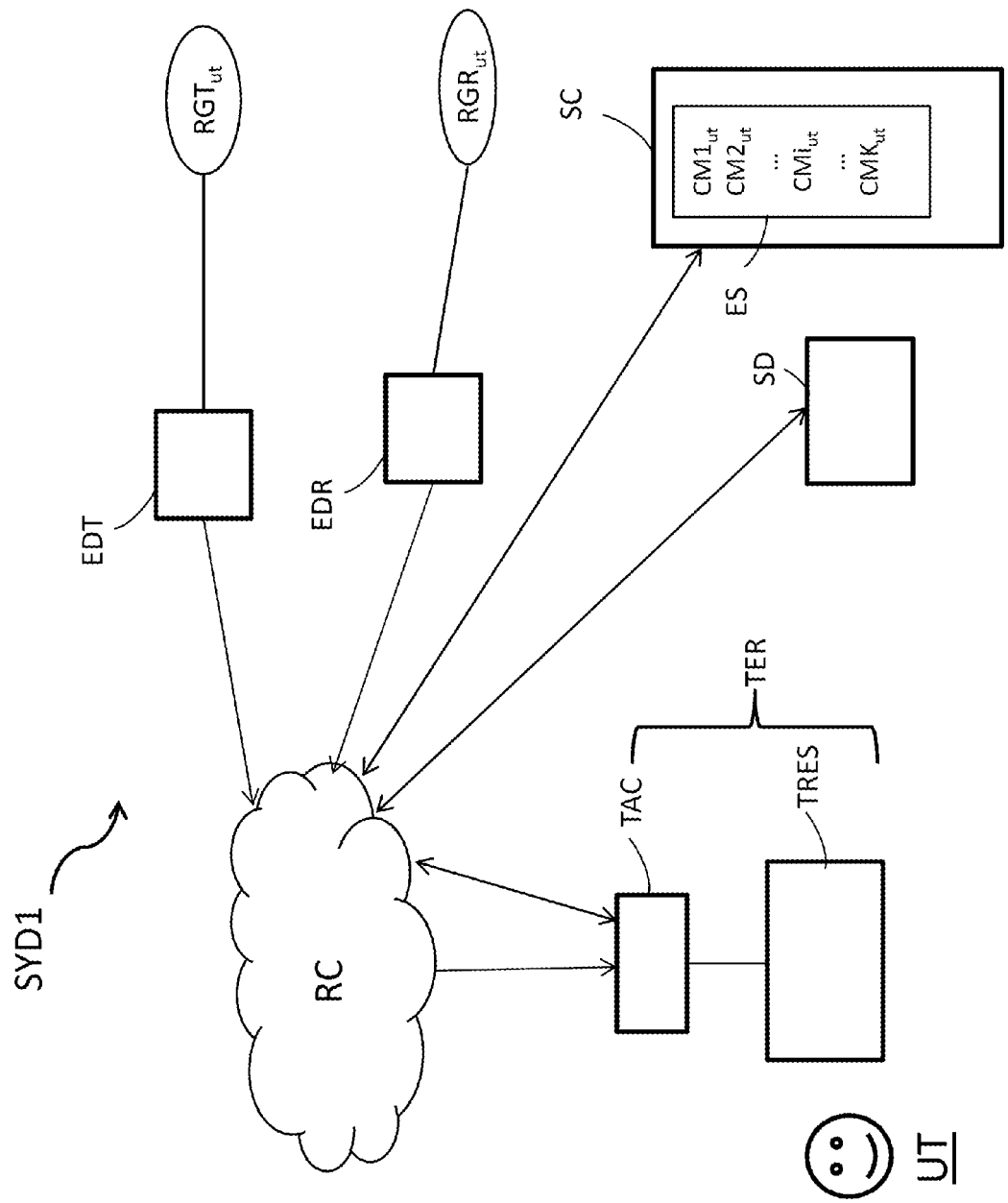
Figure 6:
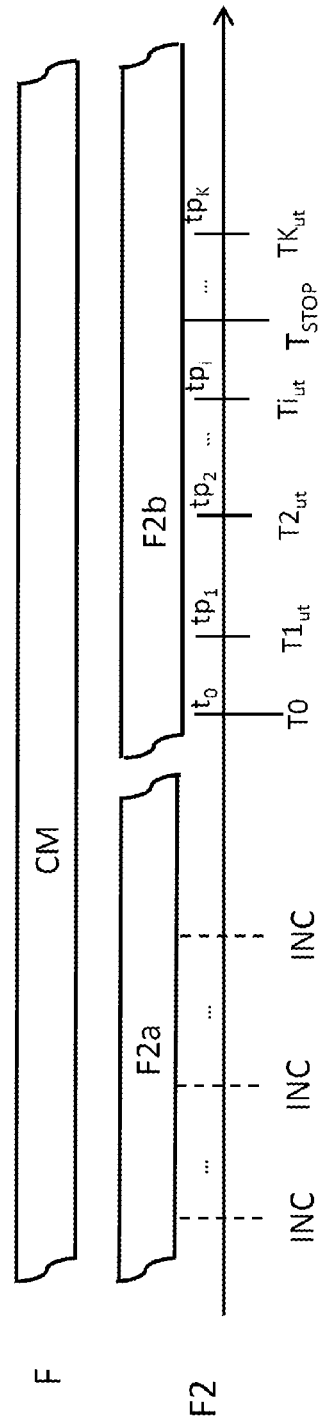
Figure 4A:
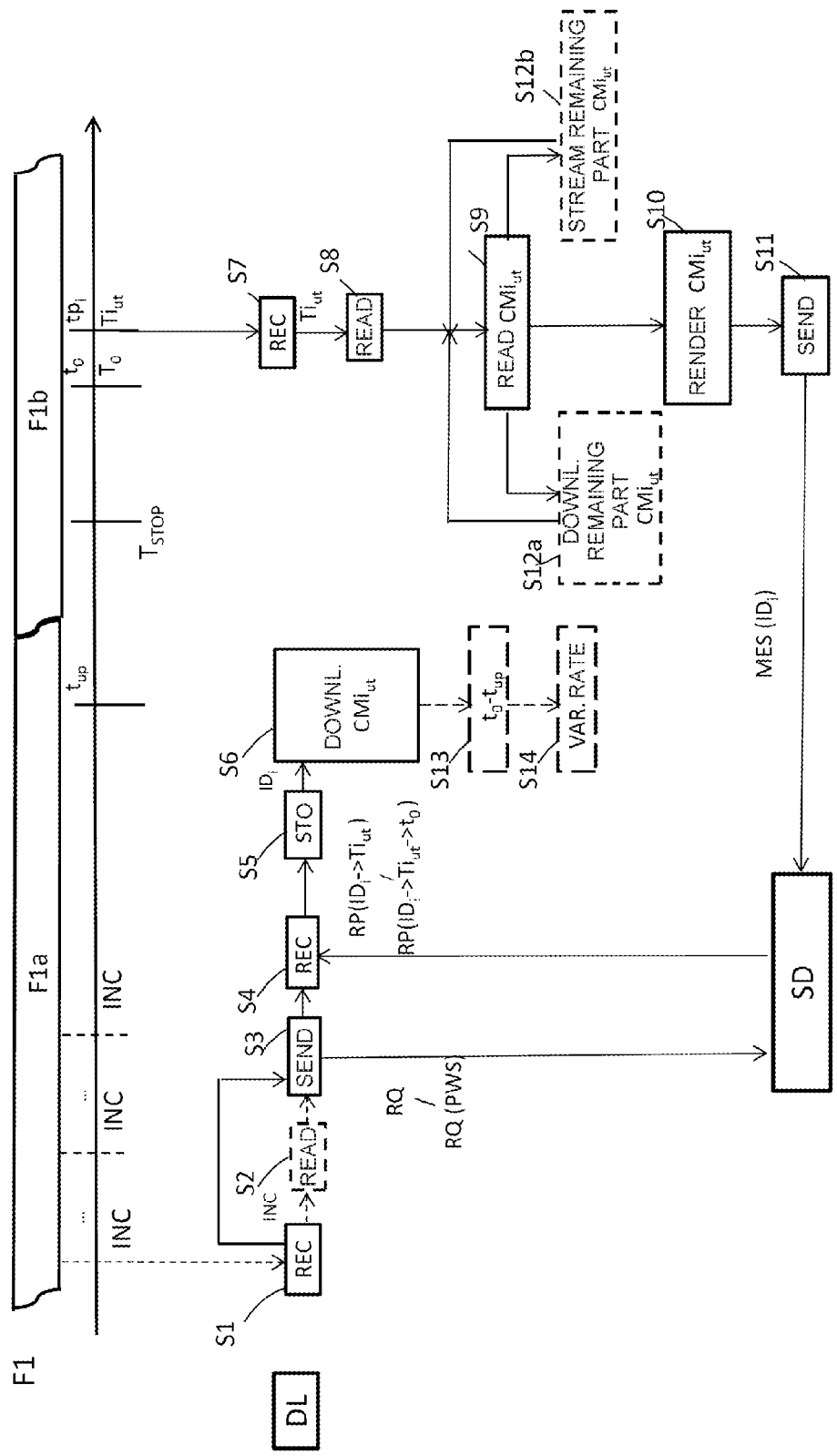
Figure 4B:
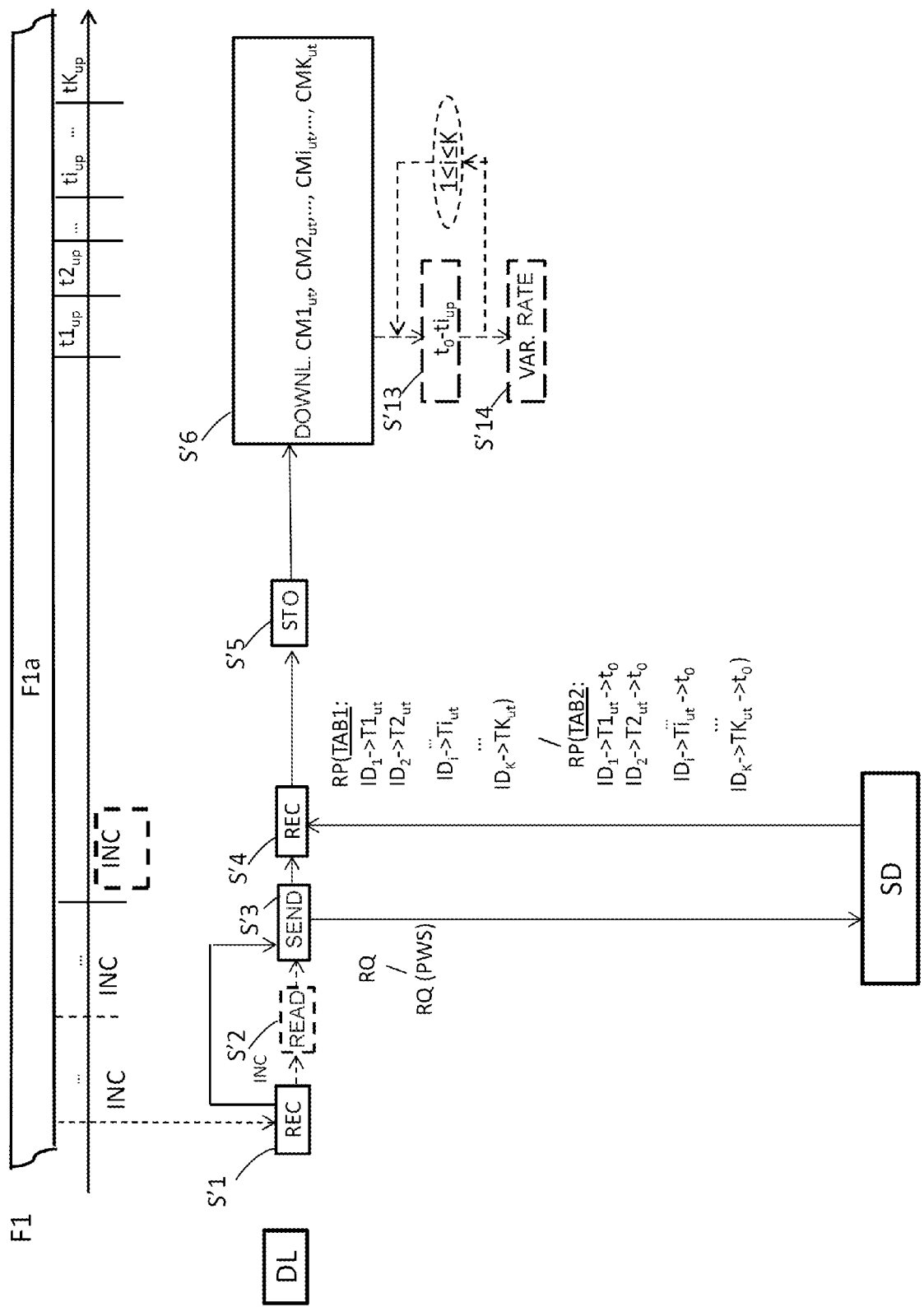
Figure 4C:
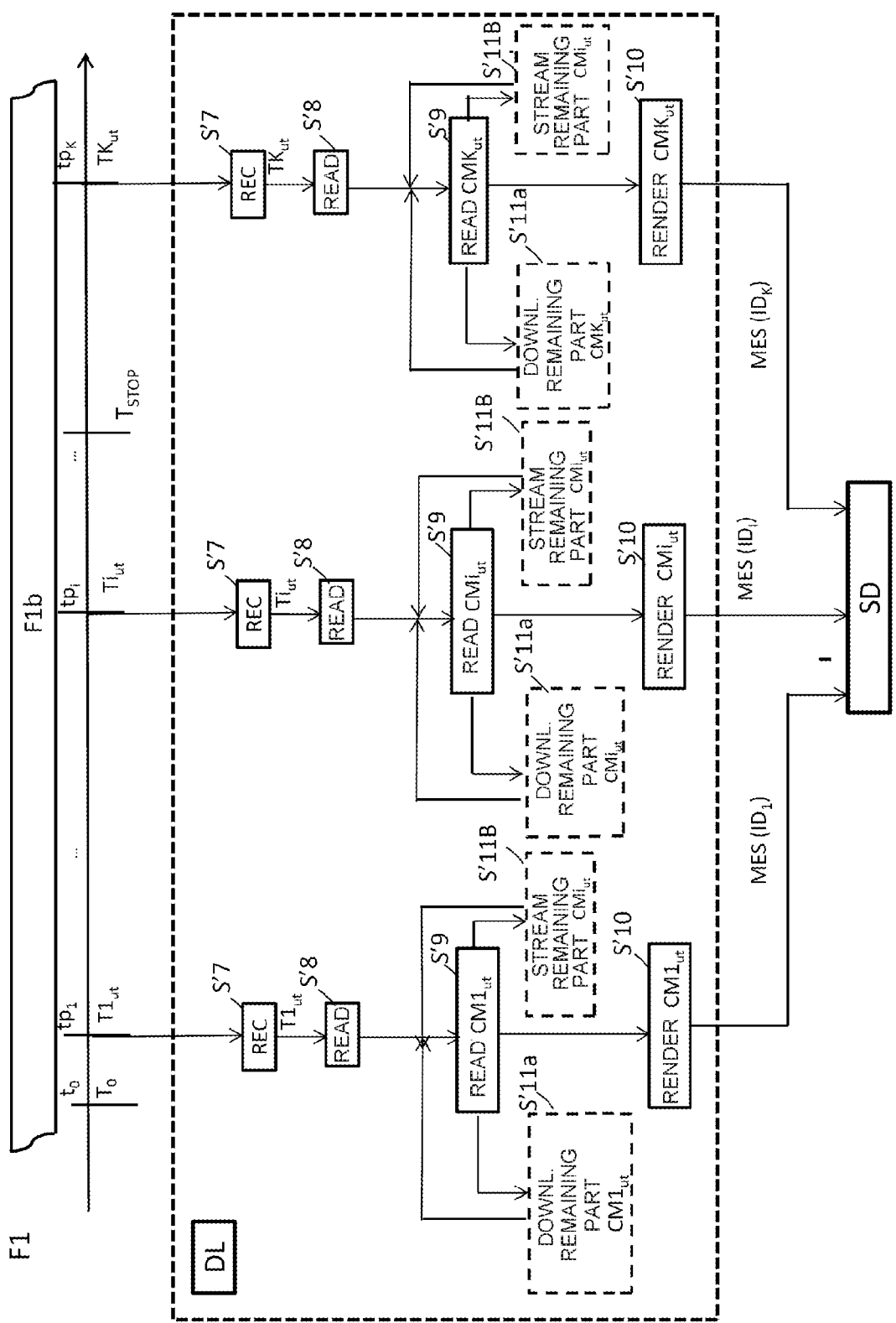
Figure 5:
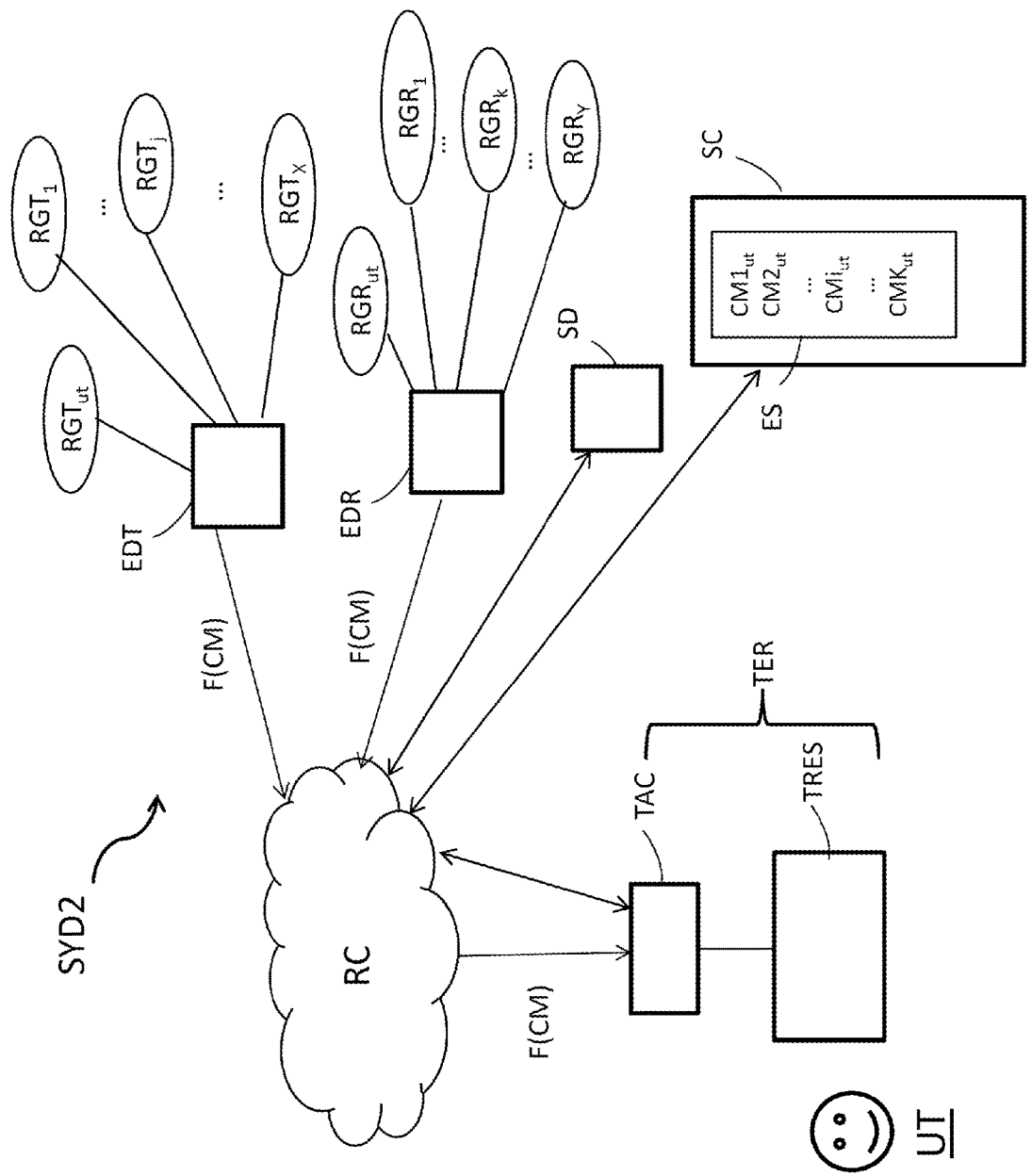
Figure 7:
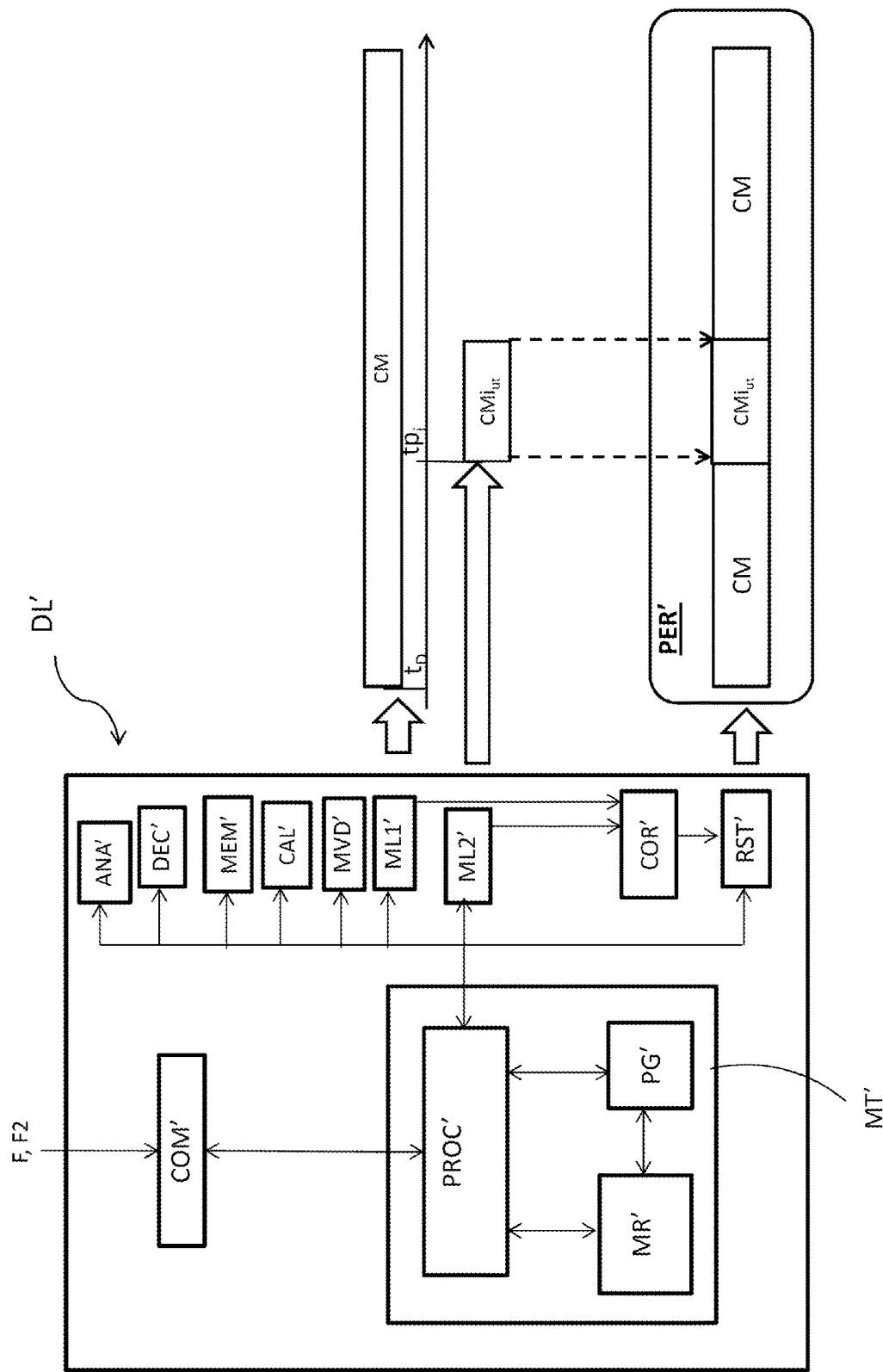
Figure 8:
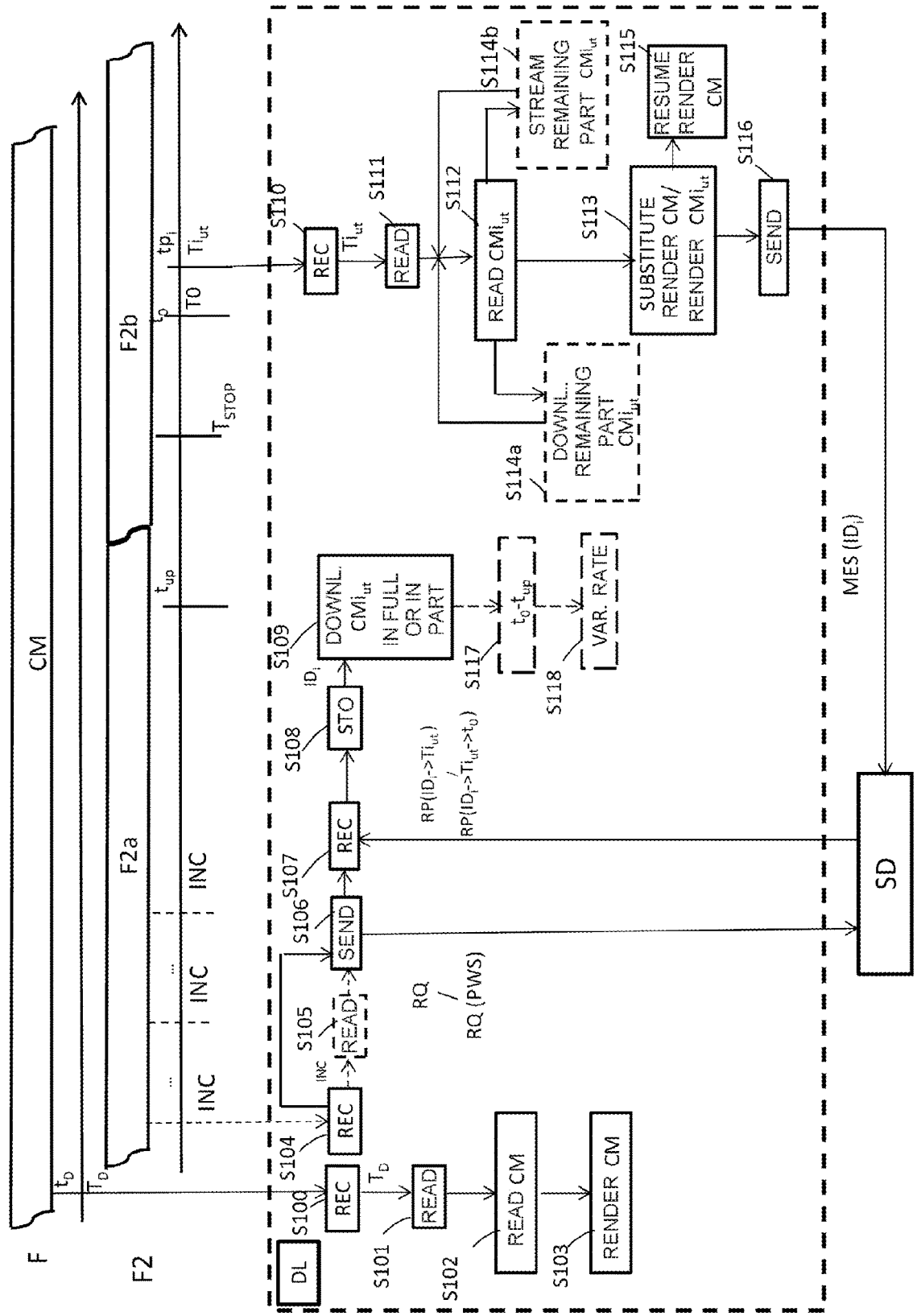

FIG. 4A schematically shows the sequence of a method for reading multimedia content, in the broadcast context of FIG. 1, according to a first alternative;

FIGS. 4B and 4C schematically show the sequence of a method for reading multimedia content, in the broadcast context of FIG. 1, according to a second alternative;

FIG. 5 schematically shows a second embodiment of an architecture in which the method for reading multimedia content according to the invention is implemented;

FIG. 6 shows the structure of a broadcast stream, according to a second embodiment;

FIG. 7 schematically shows a second embodiment of a reading device implementing the method for reading multimedia content;

FIG. 8 schematically shows an embodiment of the sequence of a method for reading multimedia content, in the broadcast context of FIG. 5.

V. DESCRIPTION OF PARTICULAR EMBODIMENTS OF THE DISCLOSURE

V.1.1 Description of the Broadcast System According to a First Embodiment

With reference to FIG. 1, what is shown is an embodiment of a stream broadcast system SYD1 in which the method for reading multimedia content according to a first embodiment is implemented.

According to an exemplary embodiment of the present disclosure, the broadcast system SYD1 comprises:
- a television broadcast company $RGT_{ut}$ dedicated solely to a user UT and able to offer said user at least one item of audiovisual multimedia content $CM_{ut}$, at a predetermined time, and/or
- a radio broadcast company $RGR_{ut}$ dedicated solely to the user UT and able to offer said user at least one item of audio multimedia content $CM_{ut}$, at a predetermined time.

To this end, the system comprises:
- broadcast equipment EDT associated with the television broadcast company $RGT_{ut}$,
- broadcast equipment EDR associated with the radio broadcast company $RGR_{ut}$.

In a manner known per se, the broadcast equipment EDT and EDR is designed to broadcast streams, for example through the air (for example: radio waves or satellite) using the technique known as the broadcast technique, or else by way of a hardware network (for example: cable or fiber) of Internet type, using the multicast or unicast technique. Each broadcast stream contains one or more items of marker information respectively associated with one or more predetermined times of reading of a given item of multimedia content.

The abovementioned broadcast system allows a terminal TER belonging to the user UT to receive the broadcasted stream from the broadcast equipment EDT or EDR, both in a mobility situation and in a stationary situation, via a communication network RC.

In a mobility situation, the terminal TER is for example a mobile telephone, a smartphone, a tablet, a portable computer, etc.

In a stationary situation, the terminal TER could be a personal computer or PC.

With continuing reference to a stationary situation, and as shown in FIG. 1, the terminal TER comprises for example:
- an access terminal TAC that is able to receive and process the broadcast streams from the broadcast equipment EDT or EDR,
- a rendering terminal TRES that is able to render at least all or part of an item of multimedia content to the user UT, starting from a predetermined time indicated in the broadcast stream that has been processed by the access terminal TAC.

In one exemplary embodiment, the access terminal TAC and the rendering terminal TRES are grouped together in a single terminal. This could be for example a television containing a set-top-box decoder. In another example, the access terminal TAC is an Internet connection module and the rendering terminal TRES is a tablet acting as a rendering terminal and connected to the module by way of a local area network, for example a wireless one, in particular of Wi-Fi or PLC (abbreviation for "power line communication") type. According to another example, the access terminal TAC is an Internet connection module and the rendering terminal is a radio set connected to this module by way of a local area network, for example a wireless one, in particular of Wi-Fi or PLC type.

The access terminal TAC is also equipped with multimedia content storage means. Alternatively, it may also be connected to an external multimedia content recording module.

The user UT may interact with the access terminal TAC using a conventional remote controller or using a terminal that comprises a suitable remote controller software application for this purpose. The access terminal TAC, as well as the terminal TER, furthermore comprise means for connecting to the communication network RC, which may be, for example, of x-DSL, fiber or else 3G, 4G or 5G type.

An item of multimedia content to be read at a predetermined time forms part of a set ES of predetermined items of multimedia content $CM1_{ut}, CM2_{ut}, \ldots, CMi_{ut}, \ldots, CMK_{ut}$, where $1 \leq i \leq K$. The set ES is stored in a content server SC that is accessible via the communication network RC.

An item of multimedia content is understood to mean an item of audiovisual content, audio content, or else graphic content (for example: image containing or not containing text). The content server SC belongs to the telecommunications operator that manages the communication network RC, or else to a service provider who has entered into a partnership with the telecommunications operator.

The broadcast system SYD1 also comprises a remote server SD that is intended to receive requests from the terminal TAC, via the communication network RC. In FIG. 1, the remote server SD is separate from the content server SC. However, according to another example, the remote server SD could comprise the content server SC.

Figure 2:
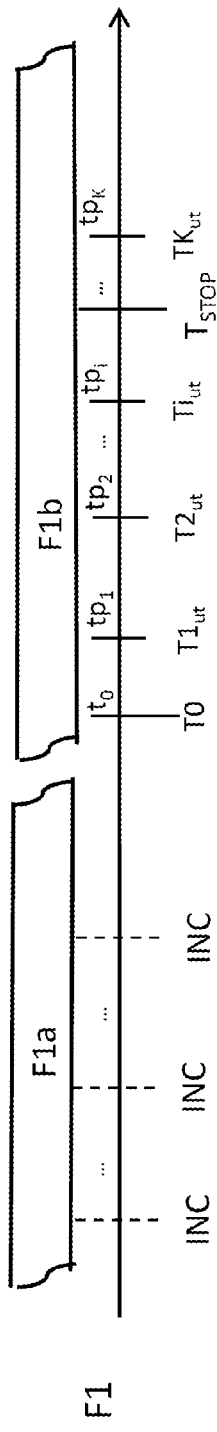
FIG. 2 shows the structure of a broadcast stream, according to a first embodiment.

V.1.2 Description of the Structure of a Broadcast Stream According to a First Embodiment With reference to FIG. 2, what is shown is a first embodiment of the structure of a stream F1, as broadcast by the broadcast equipment EDT and EDR of FIG. 1.

The stream F1 is formed of two portions F1a and F1b.

The stream portion F1a is edited prior to broadcasting thereof and may or may not contain an item of information INC that relates to an item of multimedia content $CM1_{ut}$ intended to be read at a predetermined time $tp_1$. The company $RGT_{ut}$ or $RGR_{ut}$ may record the item of information INC in the stream portion F1a several times, for example every 30 seconds. As the information INC is optional, it is shown in dashed form in FIG. 2.

The stream portion F1b is edited prior to broadcasting thereof so as to contain:
an item of marker information $T1_{ut}$ that is a temporal marker of the predetermined time $tp_1$,
another item of marker information $T_0$ that is a temporal marker of a time $t_0$ preceding the predetermined time $tp_1$ by a few seconds.

The stream portion F1b may optionally contain an item of marker information $T_{STOP}$ added in real time and associated with a specific item of multimedia content broadcast in real time. This specific item of multimedia content is an item of information of exceptional nature that the television broadcast company $RGT_{ut}$ or radio broadcast company $RGR_{ut}$ needs to broadcast as quickly as possible to the user UT as soon as it has gained knowledge thereof.

In the example of FIG. 2, the two stream portions F1a and F1b belong to the same stream F1. According to another example, the stream portions F1a and F1b could correspond to two separate streams.

As shown in FIG. 2, a plurality of K items of multimedia content $CM1_{ut}, CM2_{ut}, \ldots, CMi_{ut}, \ldots, CMK_{ut}$, such that $K \geq 1$, are intended to be read respectively at predetermined times $tp_1, tp_2, \ldots, tp_i, \ldots, tp_K$. To this end, the stream portion F1b is edited prior to broadcasting thereof so as to contain a plurality of items of marker information $T1_{ut}, T2_{ut}, \ldots, Ti_{ut}, \ldots, TK_{ut}$, which are respectively associated with the predetermined times $tp_1, tp_2, \ldots, tp_i, \ldots, tp_K$. According to this embodiment, if an item of information INC is present in the stream portion F1a, the item of information INC relates to the plurality of K items of multimedia content $CM1_{ut}, CM2_{ut}, \ldots, CMi_{ut}, \ldots, CMK_{ut}$.

In the example of FIG. 2, the marker information is signaled directly in the stream F1, that is to say in-band.

According to one embodiment, the abovementioned items of marker information are markers, such as for example of SCTE 104/35 type.

According to another embodiment that is not shown, the abovementioned items of marker information are indicated in a signaling substream associated with the stream F1.

Figure 3:
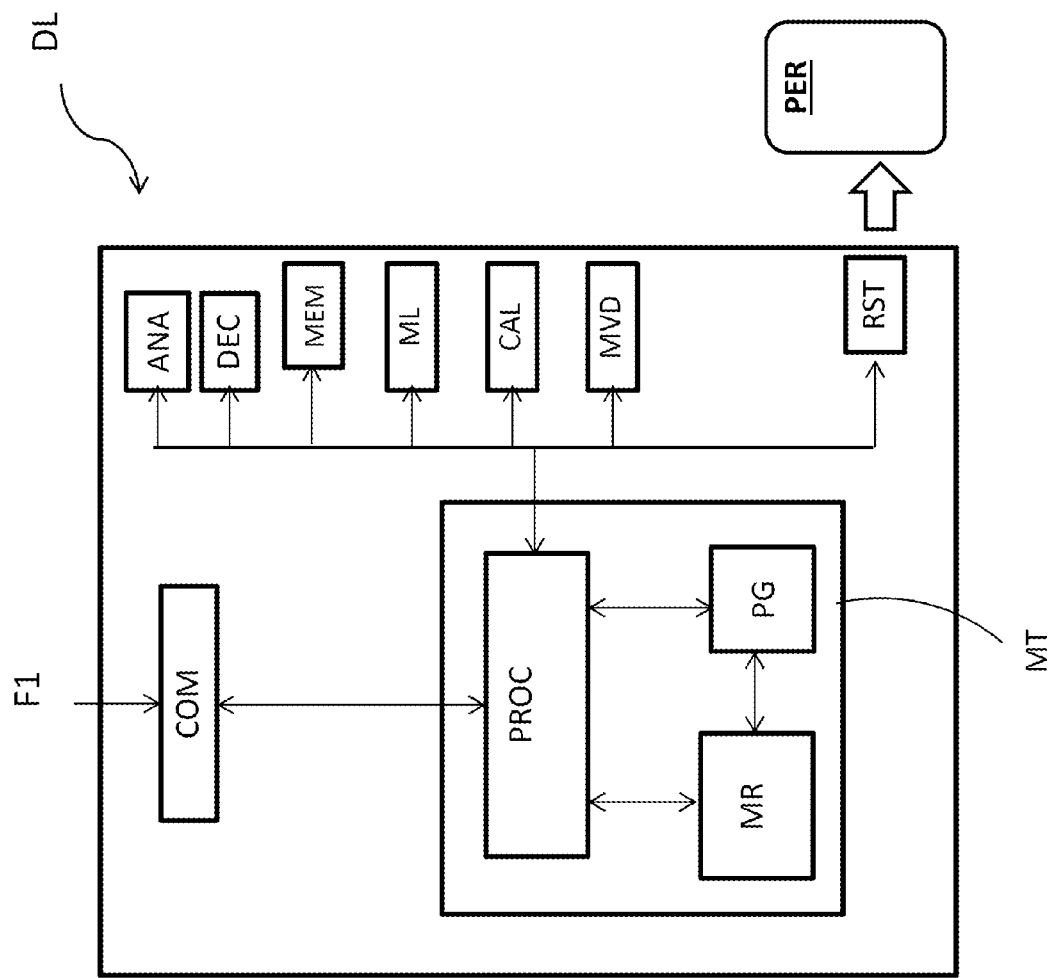
FIG. 3 shows a first embodiment of a reading device implementing the method for reading multimedia content.

V.1.3 Description of a Device for Reading Multimedia Content According to a First Embodiment With reference to FIG. 3, consideration is now given, according to a first embodiment, to the simplified structure of a device DL for reading multimedia content according to an exemplary embodiment of the present disclosure. Such a device is contained in the access terminal TAC of FIG. 1, according to one exemplary embodiment of the disclosure. Such a reading device DL is designed to implement the method for reading multimedia content according to the disclosure that will be described below with reference to FIGS. 4A to 4C.

The reading device DL comprises:
a communication module COM that is designed to communicate, via the communication network RC, in accordance for example with the http (abbreviation for "HyperText Transfer Protocol") protocol, with the broadcast equipment EDT and EDR of FIG. 1,
a module ANA for analyzing the streams received from the broadcast equipment EDT or EDR,
a data storage module MEM, such as for example a buffer memory, that is designed to contain information extracted from the received streams, and multimedia content,
a module DEC for audio, video or else audio/video decoding of the multimedia content data, said data possibly being of text and/or audio and/or image and/or video and/or audiovisual type,
a module ML for reading multimedia content,
a rendering module RST that is designed to render the read multimedia content, on a peripheral device PER,
a module CAL that is designed to calculate durations between various times marked in the streams received from the broadcast equipment EDT or EDR,
a module MVD that is designed to vary the data transmission rate in the communication network RC.

The reading device DL comprises physical and/or software resources, in particular a processing module MT for implementing the method for reading multimedia content of FIGS. 4A to 4C.

The processing module MT contains a processor PROC driven by a computer program PG. The modules COM, ANA, MEM, ML, CAL, MVD and RST are driven by the processor PROC of the processing module MT.

On initialization, the code instructions of the computer program PG are for example loaded into a RAM memory, denoted MR, before being executed by the processing module MT.

V.1.4 Description of a Method for Reading Multimedia Content According to a First Embodiment a) First Variant A first variant of a first embodiment of the reading method according to the present disclosure is now described with reference to FIG. 4A.

Prior to this method, the user UT of the reading device DL has signed up beforehand to a service for reading scheduled multimedia content, for example with the telecommunications operator with which he has subscribed to a subscription. When signing up, the user UT indicated one or more items of profile information PWS relating to him, such as for example:

- the district of the town in which the user UT lives, and/or
- the name of the road on which the user UT lives, and/or
- the age of the user UT, and/or
- the nationality of the user UT, and/or
- the annual income of the user UT, and/or
- the status of the user UT, for example married, single, childless, large household, student, executive, employee, and/or
- the type of subscription to which the user UT has subscribed, and/or
- one or more time slots during which the user UT tends to watch television or to listen to the radio,
- the genre(s) of content that the user UT prefers (for example: news, film, variety programs, radio shows, photo slideshows, etc.),
- the category(ies) of content that the user UT prefers (for example: science fiction, classical music, wild animals, etc.).
- etc.

In the first variant considered in FIG. 4A, it is considered that at least one item of multimedia content $CMi_{ut}$ is intended to be read at a predetermined broadcast time $tp_i$. It is also considered that the reading device DL is in standby mode, the user UT either being absent from his home or at home, but not needing to operate his reading device.

The reading method then proceeds as follows:

At S1, the communication module COM of FIG. 3 receives the stream F1, such as the one shown in FIG. 2. According to a first variant, in which no abovementioned item of information INC is present in the stream portion F1a, at the end of a predetermined duration configured in the reading device DL or else upon reception of a request transmitted from the remote server SD, the processing module MT activates the communication module COM at S3, so that it sends, to the remote server SD, via the communication network RC of FIG. 1, a request RQ to provide an item of multimedia content to be read at a predetermined time.

According to a second variant, in which one or more abovementioned items of information INC are present in the stream portion F1a, over the course of the reception S1, the module COM receives an item of information INC contained in the stream portion F1a, the item of information INC relating to an item of multimedia content to be read at a predetermined time broadcast later, in the portion F1b of the stream F1.

At S2, the analysis module ANA of FIG. 3 reads the item of information INC.

At S3, following the reading of the item of information INC, the processing module MT activates the communication module COM, so that it sends, to the remote server SD, via the communication network RC of FIG. 1, a request RQ to provide an item of multimedia content to be read at a predetermined time.

This is done such that the item of information INC recorded in the stream portion F1a is associated with a preparatory period of time for the sending action S3. This preparatory period of time associated with the item of information INC is predefined and is of the order of a few seconds, for example 8 s.

At S4, the communication module COM receives, from the remote server SD, a response RP to the request RQ. The response RP contains:

- an identifier $ID_i$ of an item of multimedia content $CMi_{ut}$ of interest for the user UT,
- and an item of stream marker information $Ti_{ut}$, associated with the identifier $ID_i$.

The item of marker information $Ti_{ut}$ is intended to be recorded in the portion F1b of the stream F1, at the predetermined time $tp_i$.

At S5, the reading device DL stores the received identifier $ID_i$ in the memory MEM, in correspondence with the received item of marker information $Ti_{ut}$.

At S6, on the basis of the identifier $ID_i$ stored at S5, the reading device DL downloads all or part of the item of content $CMi_{ut}$ in the memory MEM or else in another memory of the device DL dedicated to the storage of multimedia content.

The item of content $CMi_{ut}$ is stored in association with the identifier $ID_i$ and the item of marker information $Ti_{ut}$.

Operations S1 to S6 are implemented before the predetermined time $tp_i$.

The reading device DL is then put into operation by the user UT and exits "standby" mode. It is considered that the station broadcast by the company $RGT_{ut}$ or $RGR_{ut}$ is selected by default.

At the predetermined time $tp_i$ recorded in the stream portion F1b, the communication module COM, at S7, receives the item of marker information $Ti_{ut}$ in the stream portion F1b.

At S8, the analysis module ANA of FIG. 3 reads the item of marker information $Ti_{ut}$.

At S9, following the reading of the item of marker information $Ti_{ut}$, the processing module MT activates the reading module ML so that it reads the item of multimedia content $CMi_{ut}$ or the part thereof that was downloaded at S6 and that corresponds to the identifier $ID_i$ stored in association with the item of marker information $Ti_{ut}$.

This is done such that the item of marker information $Ti_{ut}$ recorded in the stream portion F1b is associated with a preparatory period of time for the reading action triggered at S9. This preparatory period of time associated with the item of marker information $Ti_{ut}$ is predefined and is of the order of a few seconds, for example 8 s.

At S10, the rendering module RST renders the item of multimedia content $CMi_{ut}$ or the part thereof on the peripheral device PER of FIG. 3, as the item of multimedia content $CMi_{ut}$ is read at S9.

Once the item of multimedia content $CMi_{ut}$ has been rendered, at S11, the communication module COM sends a message MES to the remote server SD indicating that the item of multimedia content $CMi_{ut}$ has been read. By way of example, the message MES may contain the identifier $ID_i$ of the item of multimedia content $CMi_{ut}$. The content provider is thus assured that the user UT has indeed read the item of multimedia content $CMi_{ut}$. This item of content is therefore for example deleted from the content list ES and will thus no longer be offered to the user UT. Operation S11 is optional.

By virtue of the method for reading multimedia content that has just been described, it is possible to invite the user UT, at the predetermined time $tp_i$ associated with the item of marker information $Ti_{ut}$ recorded in a broadcast stream F1 received by the reading device DL, to view and/or to listen to an item of multimedia content stored beforehand in the reading device and that is likely to please the user UT.

Given the fact that the downloading of all or part of the item of multimedia content to be read at the predetermined time takes place in advance in the reading device DL, the item of multimedia content $CMi_{ut}$ may advantageously be downloaded with a level of quality higher than that which it would have if it were to be broadcast in real time at the predetermined time $tp_i$, which is all the more beneficial for the user UT, whose local area network, to which the reading device DL is connected, may have a low transmission rate.

Furthermore, since the item of multimedia content $CMi_{ut}$ has been downloaded in advance, reading of this item of content at S9 is advantageously stable as it is independent of the bit rate fluctuations of the local area network to which the reading device DL is connected.

When, at S6, only part of the item of multimedia content $CMi_{ut}$ has been downloaded, either because the transmission rate of the data in the local area network of the user UT has been slowed or because the time was not long enough to download the entire item of content $CMi_{ut}$ before the predetermined time $tp_i$, according to a first variant, the remaining part of the item of multimedia content $CMi_{ut}$ is downloaded at S12a, at the same time as the reading, at S9, of the part that has already been downloaded before the predetermined time $tp_i$, such that the remaining part is read and then rendered in turn, once the reading and the rendering of the already downloaded part have ended. The user UT is thus able to view and/or listen to the entire item of multimedia content $CMi_{ut}$ at the predetermined time $tp_i$ and benefit from the complete downloading of this item of content so as possibly to view it again and/or listen to it again later.

According to one particularly advantageous case of use, the item of multimedia content $CMi_{ut}$ could be an item of multimedia content broadcast live at a time slightly before the predetermined time $tp_i$, the user UT being available to view and/or listen to the item of multimedia content $CMi_{ut}$ only from this time. The user UT thus has the possibility of viewing and/or listening to the item of multimedia content $CMi_{ut}$ later on in comparison with the time at which the broadcast of this item of multimedia content began.

According to a second variant, once the part of the item of multimedia content $CMi_{ut}$ that has already been downloaded has been read at S9, the remaining part of the item of multimedia content $CMi_{ut}$ is read in real time in the stream portion F1b, at S12b, according to a well-known adaptive streaming method.

According to one embodiment, the item of marker information $Ti_{ut}$ that was received at S4 is furthermore associated with a time $t_0$ that is equal to, or slightly before, the predetermined time $tp_i$. In this way, the item of multimedia content $CMi_{ut}$ or the part thereof that is downloaded at S6 is implemented using a data transmission rate that takes into account the duration between a time $t_{up}$, starting at which the downloading S6 began, and the time $t_0$.

To this end, the processing module MT activates the calculating module CAL so that it calculates the duration $t_0 - t_{up}$ at S13.

At S14, the processing module MT activates the bit rate variation module MVD so as to download the item of multimedia content $CMi_{ut}$ more or less quickly depending on the respectively shorter or longer duration $t_0 - t_{up}$ that was calculated at S13.

As operations S12a, S12b, S13 and S14 are optional, they are shown in dashed form in FIG. 4A.

According to one embodiment, the request RQ sent to the remote server SD at S3 contains the profile information PWS relating to the user UT, thereby making it possible to offer, at the predetermined time $tp_i$, an item of multimedia content $CMi_{ut}$ that is perfectly targeted to the time at which the user UT requests this item of content.

According to one embodiment, the identifier $ID_i$ that was received at S4 is an address for accessing the item of multimedia content $CMi_{ut}$, that is to say directly from the server SD, which, according to one possible example, not shown in FIG. 1, may contain the content server SC. Such an access address is for example a URL ("uniform resource locator").

According to another embodiment, the identifier ID; that was received at S4 is a character string from which an address for accessing the item of multimedia content $CMi_{ut}$ from the content server SC is created in the reading device DL, the access address that is created being a URL. Such a character string comprises for example the name of the file that contains the item of multimedia content $CMi_{ut}$, such as for example:

"$CMi_{ut}$.mp4" if the file is an mp4 file,
"$CMi_{ut}$.mp3" if the file is an mp3 file,
"$CMi_{ut}$.jpg" if the file is a jpeg file.

According to one particular embodiment, in some situations, the company $RGT_{ut}$ or $RGR_{ut}$ may also decide to add at least one new item of marker information $T_{STOP}$ into the stream portion F1b, as described and shown with reference to FIG. 2. Once the item of information $T_{STOP}$ has been read by the analysis module ANA of FIG. 3, stoppage of the rendering of the item of multimedia content currently being read is triggered for the purpose of rendering a specific item of multimedia content in real time, such as for example an audio and/or video newsflash informing the user UT of a particular event of exceptional nature, such as for example the kidnapping of a child.

The item of marker information $T_{STOP}$ is configured such that the stoppage of the rendering of the current item of multimedia content is triggered after a predefined period of time of a few seconds, for example 8 s, after the reading of this item of information.

b) Second Variant

A second variant of the first embodiment of the reading method according to the disclosure is now described with reference to FIGS. 4B and 4C.

The reading method of FIG. 4B has operations in common with the operations of the reading method of FIG. 4A, which have taken place before the predetermined reading time $tp_i$. For this reason, these operations will not be described again.

The reading method of FIG. 4B is distinguished from that of FIG. 4A in that a plurality of items of multimedia content $CM1_{ut}$, $CM2_{ut}$, . . . , $CMi_{ut}$, . . . , $CMK_{ut}$ are read at corresponding predetermined times $tp_1$, $tp_2$, . . . , $tp_i$, . . . , $tp_K$ that are shown in FIG. 4C. The predetermined times $tp_1$, $tp_2$, . . . , $tp_i$, . . . , $tp_K$ are indicated in the stream portion F1b by corresponding items of marker information $T1_{ut}$, $T2_{ut}$, . . . , $Ti_{ut}$, $TK_{ut}$.

In the same way as for the abovementioned first variant, prior to the reading method of FIGS. 4B and 4C, the user UT of the reading device DL has signed up beforehand to a service for reading scheduled multimedia content, for example with the telecommunications operator with which he has subscribed to a subscription. When signing up, the user UT indicated one or more items of profile information PWS.

The reading method according to this second alternative then proceeds by implementing the operations S'1, S'2, S'3, which are identical to those described in FIG. 4A. The reading method is distinguished from that of FIG. 4A through the implementation of an operation S'4, during which the communication module COM receives, from the remote server SD, a response RP to the request RQ. The response RP contains a table TAB1 that contains:

- an identifier $ID_1$ of an item of multimedia content $CM1_{ut}$ of interest for the user UT, in association with an item of stream marker information $T1_{ut}$, associated with the identifier $ID_1$,
- an identifier $ID_2$ of an item of multimedia content $CM2_{ut}$ of interest for the user UT, in association with an item of stream marker information $T2_{ut}$, associated with the identifier $ID_2$,
- etc.
- an identifier $ID_i$ of an item of multimedia content $CMi_{ut}$ of interest for the user UT, in association with an item of stream marker information $Ti_{ut}$, associated with the identifier $ID_i$,
- etc.,
- an identifier $ID_K$ of an item of multimedia content $CMK_{ut}$ of interest for the user UT, in association with an item of stream marker information $TK_{ut}$, associated with the identifier $ID_K$.

According to one particular embodiment, the table TAB1 contains an identifier $ID_{STOP}$ of a specific item of multimedia content $CM_{info}$ that relates to an item of information of exceptional nature, intended to be broadcast in real time in the stream portion F1b, the identifier $ID_{STOP}$ being associated with an item of marker information $T_{STOP}$. Such an item of information liable to be broadcast in real time may be for example the announcement of an important event, such as for example an attack, a natural disaster, the kidnapping of a child, etc. Such information liable to be broadcast in real time may also be linked to the profile information PWS of the user UT. If for example the profile information PWS of the user is associated with the topic "Brazilian football", the item of information that is broadcast in real time relates for example to a video of the goals scored in the last match played in Brazil.

The items of marker information $T1_{ut}, T2_{ut}, \ldots, Ti_{ut}, \ldots, TK_{ut}$ are intended to be recorded in the portion F1b of the stream F1, at corresponding predetermined times $tp_1, tp_2, \ldots, tp_i, \ldots, tp_K$.

At S'5, the reading device DL stores the received table TAB1 in the memory MEM.

At S'6, on the basis of the identifiers $ID_1, ID_2, \ldots, ID_i, \ldots, ID_K$ stored at S'5, the reading device DL downloads all or some of the corresponding items of multimedia content $CM1_{ut}, CM2_{ut}, \ldots, CMi_{ut}, \ldots, CMK_{ut}$ in the memory MEM or else in another memory of the device DL dedicated to the storage of multimedia content.

The items of content $CM1_{ut}, CM^2_{ut}, \ldots, CMi_{ut}, \ldots, CMK_{ut}$ are stored in association with their corresponding identifiers $ID_1, ID_2, \ldots, ID_i, \ldots, ID_K$ and their corresponding items of marker information $T1_{ut}, T2_{ut}, \ldots, Ti_{ut}, \ldots, TK_{ut}$.

Operations S'1 to S'6 are implemented before the predetermined times $tp_1, tp_2, \ldots, tp_i, \ldots, tp_K$.

According to one embodiment, each item of marker information $T1_{ut}, T2_{ut}, \ldots, Ti_{ut}, \ldots, TK_{ut}$ that was received at S'4 is furthermore associated, in a table TAB2, with a time $t_0$ that is equal to, or slightly before, the first predetermined time $tp_1$ temporally marked in the stream portion F1b of FIG. 4C. In this way, the downloading, at S'6, of each item of multimedia content or of part of this content is implemented at a data transmission rate that takes into account the duration between each time $t1_{up}, t2_{up}, \ldots, ti_{up}, \ldots, tK_{up}$, starting from which the downloading S'6 of each item of content began, and the time $t_0$.

To this end, the processing module MT activates the calculating module CAL so that it calculates the respective durations $t_0-t1_{up}, t_0-t2_{up}, \ldots, t_0-ti_{up}, \ldots, t_0-tK_{up}$ at S'13.

Like the table TAB1, the table TAB2 may contain an identifier $ID_{STOP}$ of a specific item of multimedia content $CM_{into}$ that relates to an item of information of exceptional nature, intended to be broadcast in real time in the stream portion F1b.

At S'14, the processing module MT activates the bit rate variation module MVD so as to download each item of multimedia content more or less quickly depending on the corresponding respectively shorter or longer duration that was calculated at S'13.

As operations S'13 and S'14 are optional, they are shown in dashed form in FIG. 4B.

According to one embodiment, the request RQ sent to the remote server SD at S'3 contains the profile information PWS relating to the user UT, thereby making it possible to offer, at each of the K predetermined times, an item of multimedia content that is perfectly targeted to the time at which the user UT requested these items of content.

According to one embodiment, the identifiers $ID_1, ID_2, \ldots, ID_i, \ldots, ID_K$ that were received at S'4 are respective addresses for accessing the items of multimedia content $CM1_{ut}, CMK_{ut}, \ldots, CMi_{ut}, \ldots, CMK_{ut}$, that is to say directly from the server SD, which, according to one possible example, not shown in FIG. 1, may contain the content server SC. Such access addresses are for example URL links.

According to another embodiment, each identifier that was received at S'4 is a character string from which an address for accessing the corresponding item of multimedia content from the content server SC is created in the reading device DL, the access address that is created being a URL link.

At the end of the operations S'1 to S'6, the reading device DL is then put into operation by the user UT and exits "standby" mode. It is considered that the station broadcast by the company $RGT_{ut}$ or $RGR_{ut}$ is selected by default.

With reference to FIG. 4C, at the various predetermined times $tp_1, tp_2, \ldots, tp_i, \ldots, tp_K$ recorded in the stream portion F1b, the communication module COM receives, at S'7, in the stream portion F1b, the corresponding items of marker information $T1_{ut}, T2_{ut}, \ldots, Ti_{ut}, \ldots, TK_{ut}$.

At S'8, the analysis module ANA of FIG. 3 reads the corresponding items of marker information $T1_{ut}, T2_{ut}, \ldots, Ti_{ut}, \ldots, TK_{ut}$.

At S'9, following the reading of the items of marker information $T1_{ut}, T2_{ut}, \ldots, Ti_{ut}, \ldots, TK_{ut}$, the processing module MT activates the reading module ML so that it reads the corresponding items of multimedia content $CM1_{ut}, CM2_{ut}, \ldots, CMi_{ut}, \ldots, CMK_{ut}$ or the part thereof that was downloaded at S'6 and which correspond respectively to the identifiers $ID_1, ID_2, \ldots, ID_i, \ldots, ID_K$ stored in association with the corresponding items of marker information $T1_{ut}, T2_{ut}, \ldots, Ti_{ut}, \ldots, TK_{ut}$.

At S'10, the rendering module RST successively renders each of the abovementioned K items of multimedia content, or part thereof, on the peripheral device PER of FIG. 3, as each item of multimedia content is read at S'9.

Once each item of multimedia content $CM1_{ut}, CM2_{ut}, \ldots, CMi_{ut}, \ldots, CMK_{ut}$ has been rendered, at S'11, the communication module COM sends a message MES to the remote server SD indicating that the item of multimedia content under consideration has been read. By way of example, for an item of multimedia content $CMi_{ut}$ under consideration, the message MES may contain the identifier $ID_i$ of the item of multimedia content $CMi_{ut}$. The content provider is thus assured that the user UT has indeed read the items of multimedia content $CM1_{ut}$, $CM2_{ut}$, ..., $CMi_{ut}$, ..., $CMK_{ut}$. These items of content are therefore for example deleted from the content list ES and will thus no longer be offered to the user UT. They will then be replaced with new items of multimedia content. Operation S'11 is optional.

By virtue of the method for reading multimedia content according to this second alternative, it is possible to offer the user UT a customized station of thematic multimedia content, by virtue of which the user UT has the possibility of successively viewing and/or listening to a plurality of items of multimedia content stored beforehand in the reading device and that are likely to please the user UT.

Given the fact that the downloading of all or some of these items of multimedia content takes place in advance in the reading device DL, the items of multimedia content may advantageously be downloaded with a level of quality higher than that which they would have if they were to be broadcast in real time at their respective predetermined times, which is all the more beneficial for the user UT, whose local area network, to which the reading device DL is connected, may have a low transmission rate.

Furthermore, since the items of multimedia content have been downloaded in advance, reading thereof at S'9 is advantageously stable as it is independent of the bit rate fluctuations of the local area network to which the reading device DL is connected.

Another advantage linked to the fact that all or some of the items of multimedia content are downloaded in advance lies in the fact that the company $RGT_{ut}$ or $RGR_{ut}$ may decide, a short time before the abovementioned time $t_0$, either to modify the order of appearance, in the stream portion F1$b$, of the items of marker information $T1_{ut}$, $T2_{ut}$, ..., $Ti_{ut}$, ..., $TK_{ut}$, or to delete one or more of these items of information.

In some situations, the company $RGT_{ut}$ or $RGR_{ut}$ may also decide to add at least one new item of marker information $T_{STOP}$ as already described further above into the stream portion F1$b$ and which, once it is read by the analysis module ANA of FIG. 3, triggers stoppage of the rendering of the item of multimedia content currently being read, for the purpose of rendering a particular item of multimedia content in real time, such as for example an audio and/or video newsflash informing the user of a particular event, such as for example the kidnapping of a child.

To this end, at S'8, the analysis module ANA of FIG. 3 reads the item of marker information $T_{STOP}$ that is associated with a particular item of information multimedia content, such as for example a text/image banner announcing for example the kidnapping of a child by specifying the name of the child, the location of the kidnapping, the time of the kidnapping, a photo of the child, etc.

At S'9, following the reading of the item of marker information $T_{STOP}$, the processing module MT activates the reading module ML so that it reads the corresponding item of multimedia content $CM_{info}$ that was downloaded at S'6 and that corresponds to the identifier $ID_{STOP}$ stored in association with the item of marker information $T_{STOP}$. The corresponding item of multimedia content $CM_{info}$ is a pre-edited and customized video relating to the child kidnapping event: the item of multimedia content comprises for example an audio message of "kidnapping alert" type, a predefined graphical location of where to embed the abovementioned text banner giving all of the information regarding the kidnapping.

At S'10, the rendering module RST then renders the item of multimedia content $CM_{info}$ with embedding of the abovementioned text/image banner on the peripheral device PER of FIG. 3.

When, at S'6, only some of the items of multimedia content $CM1_{ut}$, $CM2_{ut}$, ..., $CMi_{ut}$, ..., $CMK_{ut}$ have been downloaded, either because the transmission rate of the data in the local area network of the user UT has been slowed or because the time was not long enough to download all of the items of content before their respective predetermined times $tp_1$, $tp_2$, ..., $tp_i$, ..., $tp_K$, according to a first variant, the remaining part of these items of multimedia content is downloaded at S'11$a$, at the same time as the reading, at S'9, of the part that has already been downloaded before each corresponding predetermined time, such that the remaining part is read and then rendered in turn, once the reading and the rendering of the already downloaded part have ended. The user UT is thus able to view and/or listen to the entirety of each item of multimedia content at the predetermined time of reading thereof and benefit from the complete downloading of these items of content so as possibly to view them again and/or listen to them again later.

According to a second variant, at S'11$b$, the remaining part of these items of content is read in real time in the stream portion F1$b$, according to a well-known adaptive streaming method.

According to one particular embodiment, if the items of multimedia content $CM1_{ut}$, $CM2_{ut}$, ..., $CMi_{ut}$, ..., $CMK_{ut}$ have not been able to be downloaded in advance in the reading device DL, these items of content may be downloaded in real time following the reading S'8, in the stream portion F1$b$, of the item of marker information $T1_{ut}$. Actions identical to the actions S'3, S'4, S'5 and S'6 of FIG. 4B will then be implemented in the reading device DL.

V.2.1 Description of the Broadcast System According to a Second Embodiment

With reference to FIG. 5, what is shown is a second embodiment of a stream broadcast system SYD2 in which the method for reading multimedia content according to a second embodiment is implemented.

The broadcast system SYD2 of FIG. 5 has elements in common with the broadcast system SYD1 of FIG. 1. For this reason, these elements are represented by the same reference numbers and will not be described again. In the example of FIG. 5, the broadcast system SYD2 comprises:

existing television station companies $RGT_1$, $RGT_2$, ..., $RGT_j$, ..., $RGT_X$;

existing radio station companies $RGR_1$, $RGR_2$, ..., $RGR_k$, ..., $RGR_Y$.

Such companies coexist with the television broadcast companies $RGT_{ut}$ and radio broadcast companies $RGR_{ut}$ that are dedicated solely to the user UT.

An item of multimedia content CM, representative of a program offered by one of the companies $RGT_1$, $RGT_2$, ..., $RGT_j$, ..., $RGT_X$ or else $RGR_1$, $RGR_2$, ..., $RGR_k$, ..., $RGR_Y$, is transported in a stream F to the access terminal TAC.

The item of television multimedia content CM is broadcast live by broadcast equipment EDT, whereas the item of radio multimedia content CM is broadcast live by broadcast equipment EDR.

V.2.2 Description of the Broadcast Stream Structure According to a Second Embodiment With reference to FIG. 6, what is shown is a second embodiment of the structure of a stream F2, as broadcast by the broadcast equipment EDT and EDR of FIG. 5.

The stream F2 is structurally the same as the stream F1 of FIG. 2. In the example of FIG. 6, the stream F2 is associated with a stream F transporting at least one item of multimedia content CM that is representative of a program offered by one of the companies $RGT_1, RGT_2, \ldots, RGT_j, \ldots, RGT_X$ or else $RGR_1, RGR_2, \ldots, RGR_k, \ldots, RGR_Y$.

Let us assume that this involves the company $RGT_i$.

If the company $RGT_i$ and the company $RGT_{ut}$ form part of the same group, the stream F2 may be a signaling substream of the stream F.

In the opposite case, the stream F2 is independent of the stream F.

V.2.3 Description of a Device for Reading Multimedia Content According to a Second Embodiment With reference to FIG. 7, consideration is now given, according to a second embodiment, to the simplified structure of a device DL' for reading multimedia content. Such a device is contained in the access terminal TAC of FIG. 5, according to one exemplary embodiment of the disclosure. Such a reading device DL' is designed to implement the method for reading multimedia content according to the disclosure that will be described below with reference to FIG. 8.

The reading device DL' comprises, in the same way as the reading device DL of FIG. 3:
- a communication module COM' that is designed to communicate, via the communication network RC, in accordance for example with the http protocol, with the broadcast equipment EDT and EDR of FIG. 5,
- a module ANA' for analyzing the streams received from the broadcast equipment EDT or EDR,
- a data storage module MEM', such as for example a buffer memory, that is designed to contain information extracted from the received streams, and multimedia content,
- a module DEC' for audio, video or else audio/video decoding of the multimedia content data, said data possibly being of text and/or audio and/or image and/or video and/or audiovisual type,
- a rendering module RST' that is designed to render the read multimedia content, on a peripheral device PER',
- a module CAL' that is designed to calculate durations between various times marked in the streams received from the broadcast equipment EDT or EDR,
- a module MVD' that is designed to vary the data transmission rate in the communication network RC.

The reading device DL' is distinguished from the reading device DL in that, instead of containing a single reading module ML, it comprises:
- a first reading module ML'1 for reading the item of multimedia content CM broadcast live in the stream F,
- a second reading module ML'2 for reading at least one item of multimedia content of interest $CMi_{ut}$, in parallel with the reading of the item of multimedia content CM by the first reading module ML'1,
- a rendering control module COR' designed to command the rendering, by the rendering module RST',
  - either of the item of multimedia content CM or portions thereof, read by the reading module ML'1,
  - or each item of multimedia content of interest read by the reading module ML'2, instead of the current item of multimedia content CM.

The reading device DL' comprises physical and/or software resources, in particular a processing module MT' for implementing the method for reading multimedia content of FIG. 8.

The processing module MT' contains a processor PROC' driven by a computer program PG'. The modules COM', ANA', MEM', ML'1, ML'2, CAL', MVD', COR' and RST' are driven by the processor PROC' of the processing module MT'.

On initialization, the code instructions of the computer program PG' are for example loaded into a RAM' memory, denoted MR', before being executed by the processing module MT'.

V.2.4 Description of a Method for Reading Multimedia Content According to a Second Embodiment A second embodiment of the reading method according to the disclosure is now described with reference to FIG. 8.

Prior to the reading method of FIG. 8, the user UT of the reading device DL' has signed up beforehand to a service for reading scheduled multimedia content, for example with the telecommunications operator with which he has subscribed to a subscription. When signing up, the user UT indicated one or more items of profile information PWS. The user UT has also for example selected by default a broadcast station from among those of the companies $RGT_1, RGT_2, \ldots, RGT_j, \ldots, RGT_X$ or else $RGR_1, RGR_2, \ldots, RGR_k, \ldots, RGR_Y$, as shown in FIG. 5. The station selected by default is for example the station of the company $RGT_i$.

In the embodiment shown in FIG. 8, it is considered that at least one item of multimedia content $CMi_{ut}$ is intended to be read at a predetermined broadcast time $tp_i$. It is also considered that the reading device DL' is operating, the user UT currently watching an item of multimedia content CM offered by the station of the company $RGT_i$.

With reference to FIGS. 7 and 8, the reading method then proceeds as follows:

At S100, the communication module COM' receives the stream F, which contains a temporal marker $T_D$ of the broadcast start time $t_D$ of the item of multimedia content CM.

At S101, the analysis module ANA' reads the temporal marker $T_D$.

At S102, after a predefined period of time of a few seconds (for example: 8 s) associated with the temporal marker $T_D$, the processing module MT' activates the reading module ML'1 so that it reads the broadcast item of multimedia content CM.

At S103, the rendering module REST' renders the item of multimedia content CM as the latter is read at S102.

At S104, the communication module COM' receives the stream F2 at the same time as the stream F. According to a first variant, in which no abovementioned item of information INC is present in the stream portion F2a, at the end of a predetermined duration configured in the reading device DL' or else upon reception of a request transmitted from the remote server SD, the processing module MT' activates the communication module COM' at S106, so that it sends, to the remote server SD, via the communication network RC of FIG. 5, a request RQ to provide an item of multimedia content to be read at a predetermined time.

According to a second variant, in which one or more abovementioned items of information INC are present in the stream portion F2a, over the course of the reception S104, the module COM' receives an item of information INC contained in the stream portion F2a, the item of information INC relating to an item of multimedia content to be read at a predetermined time broadcast later, in the portion F2b of the stream F2.

At S105, the analysis module ANA' of FIG. 7 reads the item of information INC.

At S106, following the reading of the item of information INC, the processing module MT' activates the communication module COM', so that it sends, to the remote server SD, via the communication network RC of FIG. 5, a request RQ to provide an item of multimedia content to be read at a predetermined time.

At S107, the communication module COM' receives, from the remote server SD, a response RP to the request RQ. The response RP contains:
an identifier $ID_i$ of an item of multimedia content $CMi_{ut}$ of interest for the user UT,
and an item of stream marker information $Ti_{ut}$, associated with the identifier $ID_i$.

The item of marker information $Ti_{ut}$ is intended to be recorded in the portion F2b of the stream F2 at the predetermined time $tp_i$.

At S108, the reading device DL' stores the received identifier $ID_i$ in the memory MEM, in correspondence with the received item of marker information $Ti_{ut}$.

At S109, on the basis of the identifier $ID_i$ stored at S108, the reading device DL' downloads all or part of the item of content $CMi_{ut}$ in the memory MEM' or else in another memory of the device DL' dedicated to the storage of multimedia content.

The item of content $CMi_{ut}$ is stored in association with the identifier $ID_i$ and the item of marker information $Ti_{ut}$.

Operations S104 to S109 are implemented before the predetermined time $tp_i$.

At the predetermined time $tp_i$ recorded in the stream portion F2b, the communication module COM', at S110, receives the item of marker information $Ti_{ut}$ in the stream portion F2b.

At S111, the analysis module ANA' of FIG. 7 reads the item of marker information $Ti_{ut}$.

At S112, following the reading of the item of marker information $Ti_{ut}$, the processing module MT' activates the reading module ML'2 so that it reads the item of multimedia content $CMi_{ut}$ or the part thereof that was downloaded at S109 and that corresponds to the identifier $ID_i$ stored in association with the item of marker information $Ti_{ut}$.

At S113, the rendering control module COR' then commands the rendering of the item of multimedia content $CMi_{ut}$, on the peripheral PER', instead of the rendering of the item of multimedia content CM that is currently being read by the first reading module ML'1.

When, at S109, only part of the item of multimedia content $CMi_{ut}$ has been downloaded, either because the transmission rate of the data in the local area network of the user UT has been slowed or because the time was not long enough to download the entire item of content $CMi_{ut}$ before the predetermined time $tp_i$, according to a first variant, the remaining part of the item of multimedia content $CMi_{ut}$ is downloaded at S114a, at the same time as the reading, at S112, of the part that has already been downloaded before the predetermined time $tp_i$, such that the remaining part is read and then rendered in turn, once the reading and the rendering of the already downloaded part have ended. The user UT is thus able to view and/or listen to the entire item of multimedia content $CMi_{ut}$ at the predetermined time $tp_i$ and benefit from the complete downloading of this item of content so as possibly to view it again and/or listen to it again later.

According to a second variant, once the part of the item of multimedia content $CMi_{ut}$ that has already been downloaded has been read at S109, the remaining part of the item of multimedia content $CMi_{ut}$ is read in real time in the stream portion F1b, at S114b, according to a well-known adaptive streaming method.

Once the item of multimedia content $CMi_{ut}$ has finished being rendered, the rendering control module COR' then commands, at S115, on the peripheral PER', renewed rendering of the item of multimedia content CM that is currently being broadcast or else of the item of multimedia content that follows the item of multimedia content CM, if broadcasting thereof has ended during the rendering of the item of multimedia content $CMi_{ut}$.

Once the item of multimedia content $CMi_{ut}$ has been rendered at S113, at S116, the communication module COM' sends a message MES to the remote server SD indicating that the item of multimedia content $CMi_{ut}$ has been read. By way of example, the message MES may contain the identifier $ID_i$ of the item of multimedia content $CMi_{ut}$. Operation S116 is optional.

Such a reading method according to the second embodiment makes it possible to replace an item of multimedia content CM currently being broadcast and viewed and/or listened to by the user UT on the fly, with an item of multimedia content $CMi_{ut}$ better suited to the profile of the user UT and that has been stored in advance in the reading device DL' with a better audio and/or video quality. In this way, regardless of the time at which the user UT selects a broadcast station, an item of multimedia content may be offered to the user UT, as a replacement for the item of multimedia content CM broadcast live by the broadcast station selected by the user UT.

According to one embodiment, the item of marker information $Ti_{ut}$ that was received at S104 is furthermore associated with a time $t_0$ that is equal to, or slightly before, the predetermined time $tp_i$. In this way, the item of multimedia content $CMi_{ut}$ or the part thereof that is downloaded at S109 is implemented using a data transmission rate that takes into account the duration between a time $t_{up}$, starting at which the downloading S109 began, and the time $t_0$.

To this end, the processing module MT' activates the calculating module CAL' so that it calculates the duration $t_0$-$t_{up}$ at S117.

At S118, the processing module MT' activates the bit rate variation module MVD' so as to download the item of multimedia content $CMi_{ut}$ more or less quickly depending on the respectively shorter or longer duration $t_0$-$t_{up}$ that was calculated at S117.

As operations S117 and S118 are optional, they are shown in dashed form in FIG. 8.

According to one embodiment, the request RQ sent to the remote server SD at S106 contains the profile information PWS relating to the user UT, thereby making it possible to offer, at the predetermined time $tp_i$, an item of multimedia content $CMi_{ut}$ that is perfectly targeted to the time at which the user UT requests this item of content.

According to one embodiment, the identifier $ID_i$ that was received at S107 is an address for accessing the item of multimedia content $CMi_{ut}$, that is to say directly from the server SD, which, according to one possible example, not shown in FIG. 5, may contain the content server SC. Such an access address is for example a URL ("uniform resource locator").

According to another embodiment, the identifier $ID_i$ that was received at S107 is a character string from which an address for accessing the item of multimedia content $CMi_{ut}$ from the content server SC is created in the reading device DL', the access address that is created being a URL. Such a character string comprises for example the name of the file that contains the item of multimedia content $CMi_{ut}$, such as for example:

"$CMi_{ut}$.mp4" if the file is an mp4 file,
"$CMi_{ut}$.mp3" if the file is an mp3 file,
"$CMi_{ut}$.jpg" if the file is a jpeg file.

The reading method that has just been described with reference to FIGS. 7 and 8 may of course be implemented for a plurality of items of multimedia content $CM1_{ut}$, $CM2_{ut}$, ..., $CMi_{ut}$, ..., $CMK_{ut}$ intended to be read at corresponding predetermined times $tp_1$, $tp_2$, ..., $tp_i$, ..., $tp_K$.

An exemplary embodiment of the present disclosure rectifies drawbacks of the above-mentioned prior art.

It goes without saying that the embodiments described above have been given purely by way of completely non-limiting indication, and that numerous modifications may be easily made by a person skilled in the art without otherwise departing from the scope of the disclosure and/or the appended claims.

The invention claimed is:

1. A method for reading an item of multimedia content with a scheduled broadcast time, at a predetermined broadcast time that is recorded in a broadcast stream received by a device for reading multimedia content, wherein the method comprises the following acts performed by said device:

before the predetermined broadcast time:
sending a request to provide said item of multimedia content to be read to a remote server,
receiving an identifier of said item of multimedia content to be read, the identifier being associated with an item of stream marker information,
storing the received identifier in correspondence with the item of marker information,
downloading a first part of said item of multimedia content on the basis of the received identifier;

at the predetermined broadcast time:
receiving a stream containing an item of marker information identical to said item of marker information that was stored before the predetermined broadcast time,
on the basis of the received identical item of marker information, reading the first downloaded part of said item of multimedia content corresponding to the identifier stored in correspondence with the item of marker information; and in which the method further comprises:
either downloading only a second part of said item of multimedia content, said downloading of said second part of said item of multimedia continuing at the same time as the reading of said downloaded first part, such that said second part is read following the first downloaded part that has been read at the predetermined broadcast time, or
reading said second part directly in the stream in real time, following said downloaded first part that has been read at the predetermined broadcast time.

2. The method according to claim 1, wherein:
the item of marker information that is received before the predetermined broadcast time is furthermore associated with a time equal to, or slightly before, the predetermined broadcast time of reading of said item of multimedia content,
the downloading of said item of multimedia content is implemented at a rate that takes into account the time equal to, or slightly before, the predetermined broadcast time of reading of said item of multimedia content.

3. The method according to claim 1, wherein, when sending the request to provide said item of multimedia content to be read at the predetermined broadcast time to the remote server, the request contains an item of profile information of a user of the reading device.

4. The method according to claim 1, further comprising receiving a further stream representative of at least one item of multimedia content with a scheduled broadcast time, different from said item of multimedia content to be read at the predetermined broadcast time, by the reading device, in parallel with the stream that is received before and/or at the predetermined broadcast time of reading of said item of multimedia content.

5. The method according to claim 1, wherein, following sending of the request to provide said item of multimedia content to be read at the predetermined broadcast time to the remote server, the reading device receives, in addition to the identifier of the item of multimedia content to be read, which is associated with the item of stream marker information, at least one other identifier of another item of multimedia content with a scheduled broadcast time to be read at another predetermined broadcast time, the other identifier itself being associated with another corresponding item of stream marker information.

6. The method according to claim 5, wherein an order of the items of marker information and/or content of the items of marker information is able to be modified.

7. The method according to claim 1, wherein, before the predetermined broadcast time of reading of said item of multimedia content, the identifier of said item of multimedia content, which has been received, is an address for accessing said item of multimedia content from the remote server or another remote server.

8. The method according to claim 1, wherein, before the predetermined broadcast time of reading of said item of multimedia content, the identifier of said item of multimedia content, which has been received, is a character string from which the reading device creates an address for accessing said item of multimedia content from a content server different from the remote server.

9. A device for reading an item of multimedia content with a scheduled broadcast time at a predetermined broadcast time that is recorded in a broadcast stream received by said device, wherein said device comprises:
a processor; and
a non-transitory computer-readable medium comprising instructions stored thereon, which when executed by the processor configure the device to:
before the predetermined broadcast time:
send a request to provide said item of multimedia content to be read to a remote server,
receive an identifier of said item of multimedia content to be read, the identifier being associated with an item of stream marker information,
store the received identifier in correspondence with the received item of marker information,
download a first part of said item of multimedia content on the basis of the received identifier;
at the predetermined broadcast time:
receive a stream containing an item of marker information identical to said item of marker information that was stored before the predetermined broadcast time,
on the basis of the received identical item of marker information, read the first part downloaded of said item of multimedia content corresponding to the identifier stored in correspondence with the item of marker information;

and further to, either downloading only a second part of said item of multimedia content, said downloading of said second part of said item of multimedia continuing at the same time as the reading of said downloaded first part, such that said second part is read following the downloaded first part that has been read at the predetermined broadcast time, or reading said second part directly in the stream in real time, following said downloaded first part that has been read at the predetermined broadcast time.

10. A non-transitory computer-readable recording medium on which there is recorded a computer program comprising instructions that, when executed by a processor of a reading device, configure the reading device to implement a method of reading an item of multimedia content with a scheduled broadcast time, at a predetermined broadcast time that is recorded in a broadcast stream received by said reading device, in which said reading device performs the following acts:

before the predetermined broadcast time:

sending a request to provide said item of multimedia content to be read to a remote server, receiving an identifier of said item of multimedia content to be read, the identifier being associated with an item of stream marker information, storing the received identifier in correspondence with the item of marker information, downloading a first part of said item of multimedia content on the basis of the received identifier;

at the predetermined broadcast time:

receiving a stream containing an item of marker information identical to said item of marker information that was stored before the predetermined broadcast time, on the basis of the received identical item of marker information, reading the first downloaded part of said item of multimedia content corresponding to the identifier stored in correspondence with the item of marker information;

and further, either downloading only a second part of said item of multimedia content, said downloading of said second part of said item of multimedia continuing at the same time as the reading of said downloaded first part, such that said second part is read following the downloaded first part that has been read at the predetermined broadcast time, or reading said second part directly in the stream in real time, following said downloaded first part that has been read at the predetermined broadcast time.

\* \* \* \* \*